United States Patent
Schwesig et al.

(10) Patent No.: US 6,831,820 B2
(45) Date of Patent: Dec. 14, 2004

(54) DEVICE AND METHOD FOR SAFELY RECOGNIZING SWITCH POSITIONS OF A ROTARY SWITCH

(75) Inventors: Günter Schwesig, Erlangen (DE); Guido Seeger, Baiersdorf (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/633,882

(22) Filed: Aug. 4, 2003

(65) Prior Publication Data

US 2004/0065533 A1 Apr. 8, 2004

(30) Foreign Application Priority Data

Aug. 2, 2002 (DE) .......................................... 102 35 502

(51) Int. Cl.[7] .................................................. H02H 9/00
(52) U.S. Cl. .......................................... 361/56; 200/179
(58) Field of Search ............................. 361/56, 91, 111, 361/119; 200/179

(56) References Cited

U.S. PATENT DOCUMENTS 5,373,410 A * 12/1994 Schreiber et al. ............. 361/56
5,481,959 A * 1/1996 Watanabe et al. ............. 91/361
6,181,985 B1 * 1/2001 O'Donnell et al. ......... 700/295

FOREIGN PATENT DOCUMENTS

DE  198 26 875 A1  12/1999
DE  100 09 707 A1   9/2001

* cited by examiner

Primary Examiner—Tuyen T. Nguyen
(74) Attorney, Agent, or Firm—Henry M. Feiereisen

(57) ABSTRACT

A device and method is described for safely recognizing a switch position angle of a rotary switch. Two redundantly configured computer units are provided to determine discrete switch positions of the rotary switch by evaluating two actual analog switch position signal values corresponding to the switch position angle, with each computer unit separately checking the actual analog switch position signal values for plausibility. Faulty switch position angles are identified by comparing the switch position angles determined by the first and the second computer unit.

11 Claims, 1 Drawing Sheet

DEVICE AND METHOD FOR SAFELY RECOGNIZING SWITCH POSITIONS OF A ROTARY SWITCH

CROSS-REFERENCES TO RELATED APPLICATIONS

This application claims the priority of German Patent Application, Serial No. 102 35 502.9, filed Aug. 2, 2002, pursuant to 35 U.S.C. 119(a)–(d), the disclosure of which is incorporated herein by reference.

BACKGROUND OF THE INVENTION

The present invention relates to a device and a method for safely recognizing switch positions of a rotary switch.

Manually operated rotary switches are used for different electrical applications, for example for entering parameters into electronic control circuits. The rotary switches are provided with a contact/sensor system and with a detent mechanism. The detent mechanism determines the number of possible switch positions and, if limit stops are provided, the angle between the left and right limit stops. The contact/sensor system is evaluated by a processing electronics connected to the switch, thereby determining the switch position. For example, on an electric stove, the switch position determines of the heating power of the associated heating plate.

Conventional devices use rotary switches with redundantly configured, galvanically separated contacts for selecting or switching functions associated with the safety of the device. The contacts are herein separately connected to a redundantly configured controller which, depending on the output encoding generated by the rotary switch, reads the switch position in Gray/Hex encoding or directly without encoding. Read errors, wiring defects and switch defects are recognized by comparing switch position values.

Such conventional rotary switches with redundantly configured contacts have several disadvantages. They are expensive, require a larger installation space, and require a potentially large number of redundant outputs depending on the number of switch positions, and a correspondingly large number of redundant controller inputs.

The German patent publication no. DE 100 09 707 A1 describes a safety switch with a first and second input switch, with the corresponding switch position of the first and second input switch redundantly defining an input-side control value.

The German patent publication no. DE 198 26 875 A1 describes a numerical control with a remote input device, wherein user input is redundantly preprocessed. The output signals of all input devices are herein transmitted to two processors, with the two processors determining from the user input data for a mutual plausibility check.

It would therefore be desirable to provide an improved device and method for determining safely, easily and cost-efficiently and with reduced wiring requirements of the switch positions of a rotary switch which provides output signals in the form of two sinusoidal, analog, switch position signal values that have a predetermined amplitude characteristics and are representative of the actual switch position angle.

SUMMARY OF THE INVENTION

According to one aspect of the present invention, a device for safely recognizing a switch position angle of a rotary switch includes two redundantly configured computer units that determine discrete switch positions of the rotary switch by evaluating two actual analog switch position signal values having a predetermined amplitude characteristic which reflects the switch position angle, with each computer unit separately checking the actual analog switch position signal values for plausibility. If the two digitized actual switch position signal values are provided to the first computer unit and the second computer unit in the form of sinusoidal signals having each a constant amplitudes and being phase-shifted with respect to each other by 90°, then the plausibility check is performed such that the signals are deemed to be plausible if the sum of the respective squares of the digitized actual switch position signal values supplied to the first computer unit or the sum of the respective squares of the digitized actual switch position signal values supplied to the second computer unit is located in a predefined range.

According to another aspect of the invention, a method for safely recognizing a switch position angle of a rotary switch includes the steps of evaluating with two redundantly configured computer units two actual analog switch position signal values having a predetermined amplitude characteristic which reflects the switch position angle, with each computer unit separately checking the actual analog switch position signal values for plausibility, determining discrete switch positions of the rotary switch from the evaluated two actual analog switch position signal values, providing the two digitized actual switch position signal values to the first computer unit and the second computer unit in the form of sinusoidal signals having each a constant amplitude and being phase-shifted with respect to each other by 90°, and performing a plausibility check such that the signals are deemed to be plausible if the sum of the respective squares of the digitized actual switch position signal values supplied to the first computer unit or the sum of the respective squares of the digitized actual switch position signal values supplied to the second computer unit is located in a predefined range.

The analog actual switch position signal values can be implemented in a particularly simple manner as sinusoidal signals; however, the signals can also have a triangular shape.

If the two actual switch position signal values are phase-shifted by 90° relative to each other, then the switch positions and/or the switch position angles can be determined from the two actual switch position signal values.

The aforedescribed plausibility check is easy to perform and can advantageously be used to identify, for example, a wiring discontinuity of an actual switch signal value.

According to a first advantageous feature of the method of the invention, if the plausibility check indicates that the signals are not plausible, the digitized actual switch position signal values supplied to the first or second computer unit, or the switch positions determined therefrom are identified as being faulty, and suitable measures can be taken depending on the severity of the error.

It has been observed that when the plausibility check of the corresponding digitized switch position signal produces errors, the determined switch position can already be identified early on as being faulty, and suitable measures can be initiated depending on the severity of the error. One of such measure can be, for example, to switch off the associated computer unit.

According to another advantageous feature of the method of the invention, the two actual switch position signal values can be sinusoidal, and the switch positions can be calculated in the form of the switch position angles α separately in the first computer unit through the relationship $$\alpha = \arctan[X1/Y1],$$

wherein X1 corresponds to the first digitized actual switch position signal value supplied to the first computer unit and Y1 corresponds to the second digitized actual switch position signal value supplied to the first computer unit, and in the second computer unit through the relationship $$\alpha = \arctan[X2/Y2],$$

wherein X2 corresponds to the first digitized actual switch position signal value supplied to the second computer unit and Y2 corresponds to the second digitized actual switch position signal value supplied to the second computer unit, wherein in each of the computer units a phase of the first digitized actual switch position signal value lags a phase of the second digitized actual switch position signal value by 90° and wherein the amplitudes of each of the digitized actual switch position signal values are constant.

A corresponding switch position angle α can be computed from the two actual switch position signal values in each computer unit by using a simple trigonometric function.

According to another advantageous feature of the invention, angular ranges that correspond to detent positions of the rotary switch position angles α can be identified and discrete switch position angles $\alpha_D$ can be associated with the angular ranges. In this way, discrete switch position angles $\alpha_D$ that correspond to the detent positions of the rotary switch can be easily determined from only two analog actual switch signal values.

According to another advantageous feature of the method of the invention, the computed switch position angles α or the discrete switch position angles $\alpha_D$ can be exchanged between the first and second computer units and crosswise compared with each other. In this way, each computer unit can separately identify faulty switch position angles α and/or faulty discrete switch position angles $\alpha_D$.

According to yet another advantageous feature of the method of the invention, the effect on a subsequent process can be minimized by, for example, identifying the determined switch positions as being faulty if the crosswise comparison indicates an insufficient agreement between the calculated switch position angles α or between the discrete switch position angles $\alpha_D$, with suitable measures then being taken depending on the severity of the error. The measures can include, for example, an optional warning or the entire subsequent process can be shut down if greater deviations are detected.

The device and method according to the invention can be used, in particular, for industrial controls where a switch position of a rotary switch which only includes the two aforedescribed analog outputs should be reliably identified. For example, the rotary switch can be installed in control panels for machine tools or production machines as a so-called override rotary switch to affect the spindle or rotation speed. The switch according to the invention can reliably identify switch position of the rotary switch, in particular when used to set limit values.

BRIEF DESCRIPTION OF THE DRAWING

Other features and advantages of the present invention will be more readily apparent upon reading the following description of currently preferred exemplified embodiments of the invention with reference to the accompanying drawing, in which the sole

DETAILED DESCRIPTION OF PREFERRED EMBODIMENTS

Figure 1:
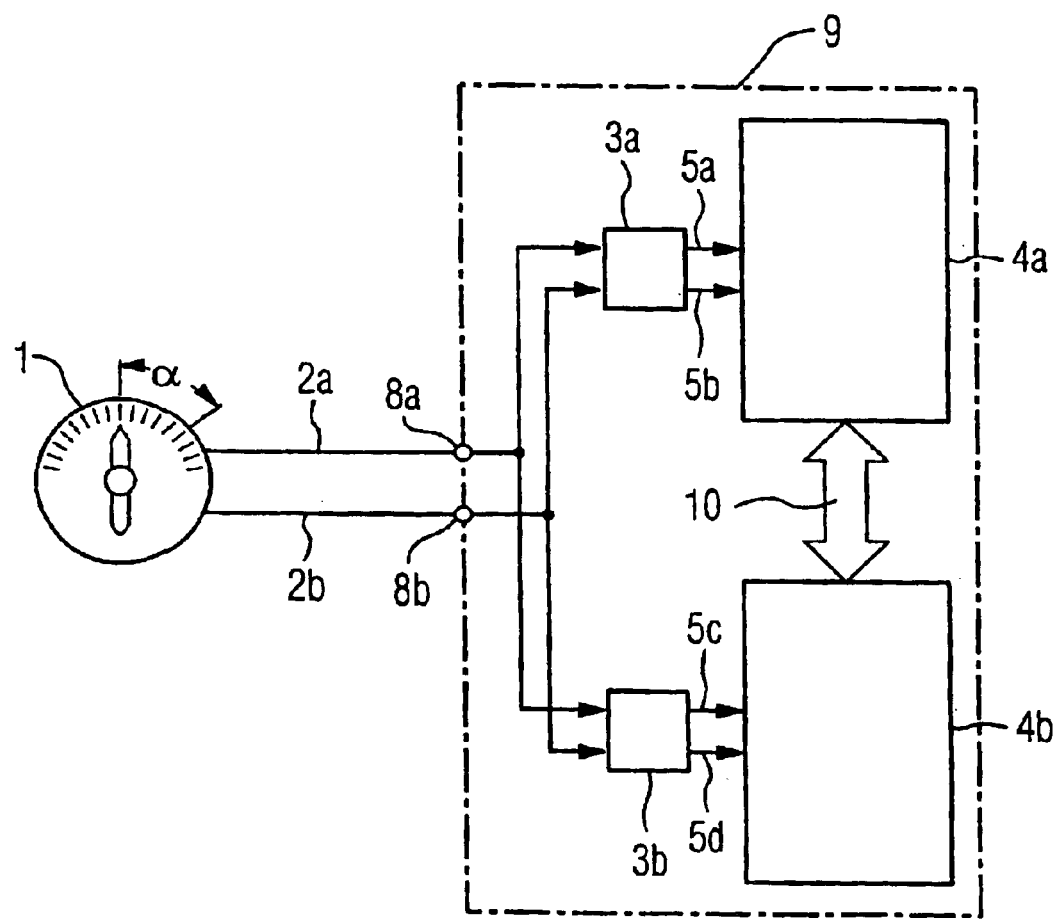
FIG. 1 is a functional block diagram of a device according to the invention.

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a block circuit diagram of the device according to the invention. A rotary switch 1 generates with the help of a magnetic, optic or capacitive sensor electronic (not shown for sake of clarity) which can be internal to the transmitter, two sinusoidal analog actual switch position signal values 2a and 2b indicative of the switch position. The signal values have an identical amplitude that remains constant and are phase-shifted relative to each other by 90°. The actual switch position signal value 2a has the form {constant amplitude*sine[a]}. The switch position signal 2b has the form {constant amplitude*cosine[a]}, wherein a indicates the switch position angle. The two actual switch position signal values 2a and 2b are supplied via two terminals 8a and 8b separately to two corresponding redundantly configured measurement value acquisition units 3a and 3b. An electronic circuit matches the two signal levels of the actual switch position signal values 2a and 2b to the input signal range of an analog/digital converter that is internal to the respective measurement value acquisition units 3a and 3b. The actual switch position signal values 2a and 2b are subsequently analog-to-digital converted in the corresponding measurement value acquisition units 3a and 3b, resulting in digitized actual switch signal values 5a, 5b, 5c and 5d which can then be further processed. The digitized actual switch signal values 5a and 5b are transmitted to a computer unit 4a. The digitized actual switch signal values 5c and 5d are transmitted to a computer unit 4b which is configured redundantly to the computer unit 4a. The computer units 4a and 4b are connected to enable exchange of data.

The method for reliably identifying a switch position of a rotary switch 1 is executed separately in the computer units 4a and 4b. Initially, the computer unit 4a checks the digitized actual switch position signal values 5a and 5b for plausibility. For this purpose, the digitized actual switch signal value 5a is squared, the digitized actual switch signal value 5b is squared, and the sum of the two squared signal values 5a and 5b is computed. The digitized actual switch signal values 5a and 5b are considered to be plausible if the sum has a value within a certain defined range. If the digitized actual switch position signal values 5a and 5b are identified as not being plausible, then the switch position of the rotary switch 1 cannot be reliably determined, so that the determined switch position may be excluded from further processing and an error message may be generated.

Likewise, computer unit 4b checks the digitized switch position signals 5c and 5d for plausibility, with measures similar to the aforedescribed measures being taken if the digitized actual switch position signal values 5c and 5d are identified as not being plausible.

Subsequently, each of the computer units 4a and 4b computes a switch position angle α. The computer unit 4a computes the switch position angle α according to the relation α=arc tan [digitized actual switch signal value 5a divided by the digitized actual switch signal value 5b]. Likewise, the computer unit 4a computes the switch position angle α according to the relation α=arc tan [digitized actual switch signal value 5c divided by the digitized actual switch signal value 5d].

Subsequently, each computer unit 4a and 4b separately computes corresponding discrete switch position angles $\alpha_D$ that correspond to the detent positions of the switch 1. For this purpose, the angular ranges that are defined by the detent positions of the rotary switch and correspond to the measured switch position angles α are determined. In this way, a corresponding discrete switch position angle $\alpha_D$ is determined for each detent position of the rotary switch. If the rotary switch does not have detent positions or the detent features are switched off, then the function for determining the discrete switch position angles can optionally also be switched off.

The switch position angles α and and/or the discrete switch position angles $\alpha_D$ are subsequently exchanged between the two computer units 4a and 4b via a link 10 and compared crosswise. If there is insufficient agreement between the computed switch position angles α and/or the discrete switch position angles $\alpha_D$, then the determined switch position is recognized as faulty and may be excluded from further processing and/or a warning signal may be generated.

Depending on the process requirements, the process can then be either immediately stopped or, for example, the last switch position recognized as being reliable can be transferred to the subsequent process.

The terminals 8a and 8b, the measurement value acquisition devices 3a and 3b and the computer units 4a and 4b form a so-called "safe controller" 9 which is surrounded in FIG. 1 by the dashed box.

It should be pointed out that the two actual switch position signal values 2a and 2b can in principle have arbitrary phase shifts, such as 120°. The switch position angle α can be computed and the plausibility of the digitized actual switch position signal values 5a, 5b, 5c and 5d checked by adapting the evaluation process accordingly.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A device for safely recognizing a switch position angle of a rotary switch, comprising:
    two redundantly configured computer units that determine discrete switch positions of the rotary switch by evaluating two digitized actual switch position signal values having a predetermined amplitude derived by A/D conversion from corresponding analog actual switch position signal values which reflect the switch position angle, with each computer unit separately checking the digitized actual switch position signal values for plausibility, wherein if the two digitized actual switch position signal values are provided to the first computer unit and the second computer unit in the form of sinusoidal signals having each a constant amplitudes and being phase-shifted with respect to each other by 90°, then the plausibility check is performed such that the signals are deemed to be plausible if the sum of the respective squares of the digitized actual switch position signal values supplied to the first computer unit or the sum of the respective squares of the digitized actual switch position signal values supplied to the second computer unit is located in a predefined range.

2. The device of claim 1, wherein faulty switch position angles are identified by comparing the switch position angles determined by the first and the second computer unit.

3. A method for safely recognizing a switch position angle of a rotary switch, comprising the steps of
    digitizing two actual analog switch position signal values having a predetermined amplitude characteristic which reflects the switch position angle,
    providing the two digitized actual switch position signal values separately to two redundantly configured computer units in the form of sinusoidal signals having each a constant amplitude and being phase-shifted with respect to each other by 90°,
    evaluating in the two redundantly configured computer units actual the two digitized switch position signal values, with each computer unit checking the actual digitized switch position signal values for plausibility,
    determining discrete switch positions of the rotary switch from the evaluated two actual digitized switch position signal values, and
    performing a plausibility check such that the switch position angle is deemed to be plausible if the sum of the respective squares of the digitized actual switch position signal values supplied to the first computer unit or the sum of the respective squares of the digitized actual switch position signal values supplied to the second computer unit is located in a predefined range.

4. The method of claim 3, wherein a faulty switch position angle is identified by comparing the switch position angles determined by the first and the second computer unit.

5. The method of claim 3, wherein if the plausibility check indicates that the switch position angle is not plausible, then the digitized actual switch position signal values supplied to the first or second computer unit, or the switch positions determined therefrom are identified as being faulty, and suitable measures are taken depending on the severity of the error.

6. The method of claim 3, wherein the two actual digitized switch position signal values are sinusoidal, and the switch positions are calculated in the form of the switch position angles α separately in the first computer unit through the relationship α=arc tan [X1/Y1], wherein X1 corresponds to the first digitized actual switch position signal value supplied to the first computer unit and Y1 corresponds to the second digitized actual switch position signal value supplied to the first com puter unit, and in the second computer unit through the relationship $\alpha = \text{arc tan}\ [X2/Y2]$, wherein X2 corresponds to the first digitized actual switch position signal value supplied to the second computer unit and Y2 corresponds to the second digitized actual switch position signal value supplied to the second computer unit, wherein in each of the computer units a phase of the first digitized actual switch position signal value lags a phase of the second digitized actual switch position signal value by 90° and wherein the amplitudes of each of the digitized actual switch position signal values are constant.

7. The method of claim 6, and further comprising the steps of identifying angular ranges that correspond to detent positions of the rotary switch position angles $\alpha$ and associating discrete switch position angles $\alpha_D$ with the angular ranges.

8. The method of claim 7, wherein the computed switch position angles $\alpha$ or the discrete switch position angles $\alpha_D$ are exchanged between the first and second computer units and crosswise compared with each other.

9. The method of claim 8, wherein the determined switch position angles are identified as being faulty if the crosswise comparison indicates an insufficient agreement between the calculated switch position angles $\alpha$ or between the discrete switch position angles $\alpha_D$, and suitable measures are being taken depending on the severity of the error.

10. Use of the device of claim 1 in an industrial controller.

11. Use of the method of claim 3 in an industrial controller.

* * * * *